Figure 1:
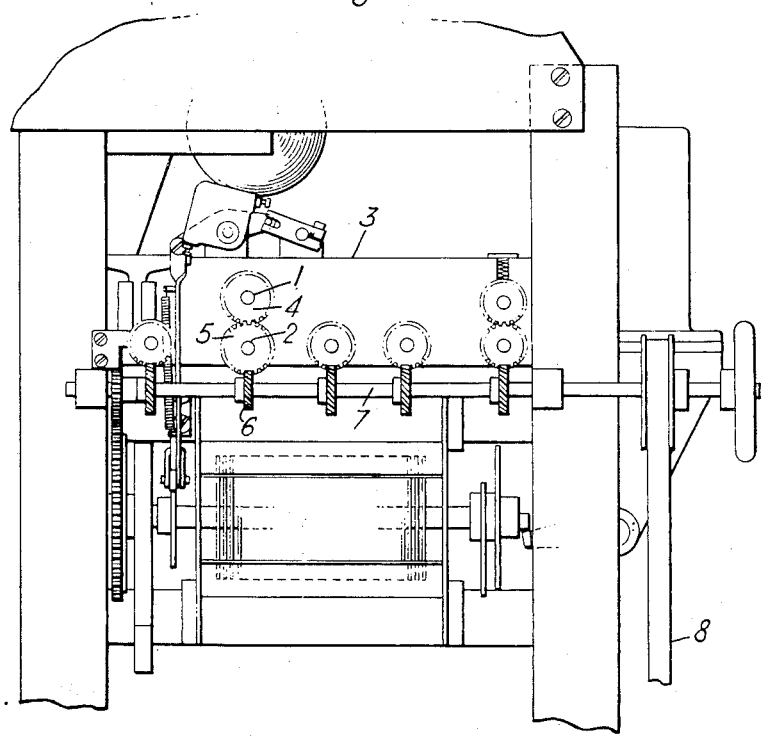

Sept. 18, 1956 R. E. BALDWIN 2,763,431
MECHANISM FOR SENSING PERFORATED RECORD CARDS
Filed Sept. 2, 1955 3 Sheets-Sheet 1

Inventor
RICHARD E. BALDWIN
By
Attorney

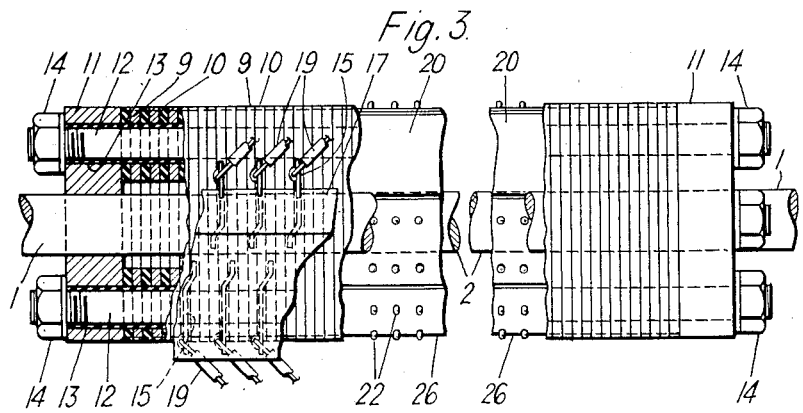
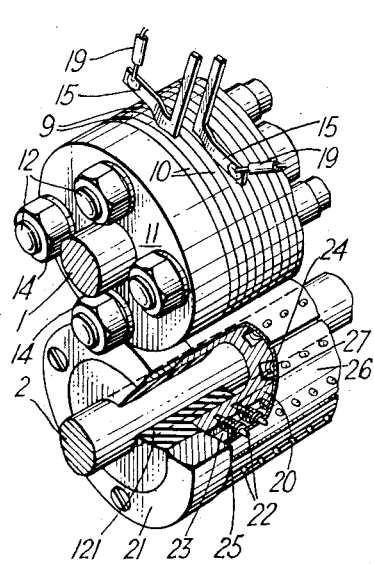
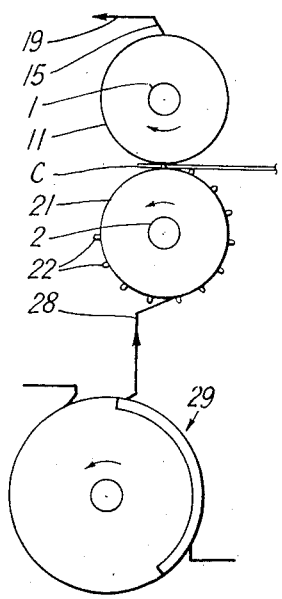

United States Patent Office — 2,763,431 — Patented Sept. 18, 1956

2,763,431
MECHANISM FOR SENSING PERFORATED RECORD CARDS

Richard Everest Baldwin, Coulsdon, England, assignor to Powers-Samas Accounting Machines Limited, London, England, a British company Application September 2, 1955, Serial No. 532,348

Claims priority, application Great Britain November 2, 1954

4 Claims. (Cl. 235—61.11)

This invention relates to statistical machines controlled by perforated record cards and has particular reference to a sensing device for use in such a machine for sensing a moving card.

It is a main object of the present invention to provide a sensing device for sensing a moving record card by the use of sensing pins supported for axial movement relative to a roller in which the pins are housed with their axes radial to the roller, and to so arrange the device that the sensing pins do not directly effect operation of movable mechanical elements as the result of axial movement of the pins.

According to the present invention there is provided a device for sensing perforations in statistical record cards comprising a first rotatable shaft, an electrically conductive disc for each card column to be sensed, electrically non-conductive discs spacing the conductive discs one from the other, clamping elements insulated from the electrically conductive discs to retain the conductive and non-conductive discs in endwise abutting relation and supporting them for angular movement with said first shaft, an electrical brush co-operating with each said conductive disc, a second shaft rotatable in timed relation with said first shaft, an electrically conductive drum insulated from said second shaft and supported thereby for angular movement therewith and to be spaced peripherally from said conductive discs, a plurality of columns of electrically conductive sensing pins, one column for each said conductive disc, each of which columns includes pins equi-spaced angularly round the drum and corresponding in number to the number of data-indicating positions in a card column, said pins being carried by said drum for movement thereby in timed relation with the feeding of cards so that the first pin of a column coincides with the first data-indicating position of a card column presented for sensing, the pins being supported for electrical co-operation with the drum and axial movement radially thereof, springs urging the pins axially away from the centre of the drum for co-operation with the conductive discs appropriate thereto, and means to apply electrical potential to said drum in timed relation with the movement of the pins by the drum.

Figure 2:
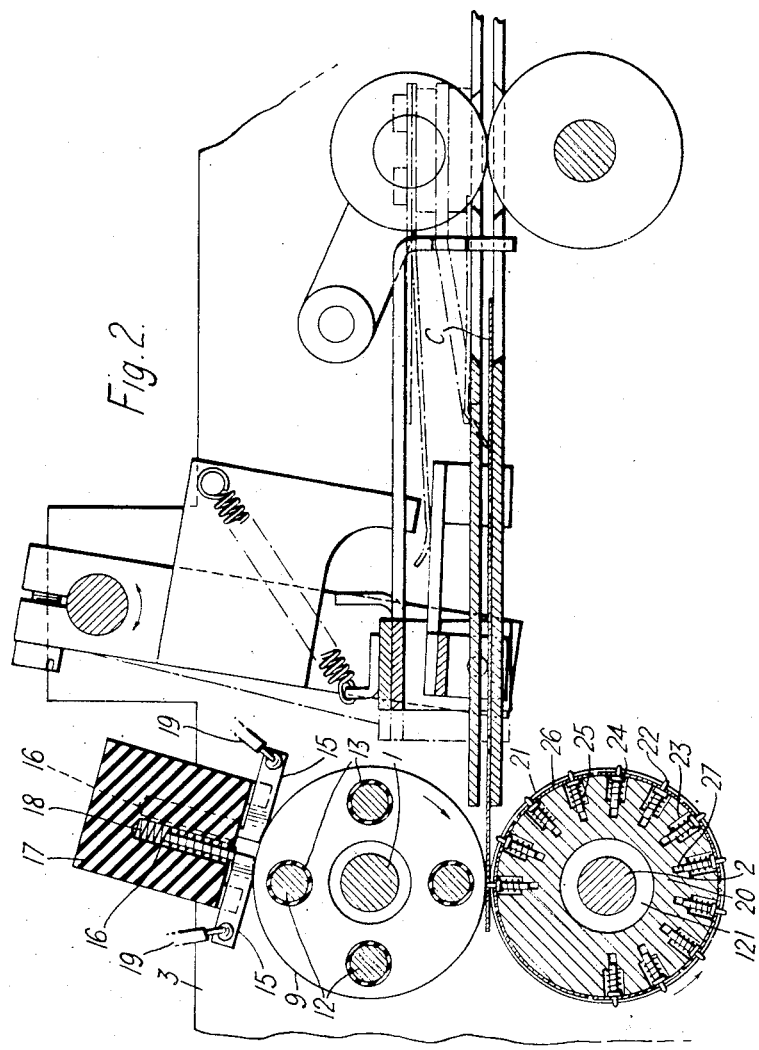

In order that the invention may be clearly understood one embodiment thereof will now be described, by way of example, with reference to the accompanying diagrammatic drawings in which:

Fig. 1 is a side elevation of part of a statistical machine having a sensing device according to the invention applied thereto, Fig. 2 is a section through a sensing device according to the invention, Fig. 3 is a broken top plan of Fig. 2, Fig. 4 is a pictorial view of a part of the sensing device according to the invention, and Fig. 5 is a circuit diagram.

Referring to the drawings, the sensing device comprises a first shaft 1 and a second shaft 2 supported for rotation in machine frames 3, Figs. 1 and 2, and located one above the other. The shafts 1 and 2 are rotated in timed relation by 1:1 ratio gears 4 and 5, Fig. 1, secured respectively to the shafts 1 and 2, the gear 5 meshing with a worm 6 secured to a drive shaft 7 of a machine which is driven in any suitable manner, as for example by a belt 8 from an electric motor, not shown.

The shaft 1 has rotatable therewith a plurality of electrically conductive discs 9, Figs. 2 to 4, one for each card column to be sensed, the discs 9 being spaced apart along the axis of shaft 1 by electrically non-conductive discs 10, Figs. 3 and 4, the discs 9 and 10 being retained in endwise abutting relation by clamping elements consisting of end plates 11 and rods 12, the rods 12 passing through the discs and the end plates and being insulated from the electrically conductive discs by electrically insulated sleeves 13. The assembly is retained in position by nuts 14 applied to the ends of the rods 12.

Each electrically conductive disc 9 has for co-operation therewith an electrical brush 15, each brush being an L-shaped element of which, as shown in Figs. 2 and 3, alternate ones face in opposite directions. The upwardly extending limbs of the brushes are located in apertures 16, Fig. 2, formed in a housing 17 common to all the brushes and made of insulating material. The elements of the brushes which co-operate with the electrically conductive discs 9 are urged into co-operation with the discs by springs 18 located in the apertures 16 in housing 17. To each brush 15 is connected an electrical lead 19 by which impulses are carried to mechanism, not shown, to be operated in accordance with the sensing of a perforated record card C, see Figs. 2 and 5.

Mounted on the shaft 2 to be angularly movable therewith is an electrically conductive drum 20, to each opposite end of which is connected an electrically conductive ring 21, Figs. 2 and 4, carried by a sleeve 121 made of insulating material by which the drum and ring 21 are insulated from the shaft 2. The rings 21 and sleeves 121 connect the drum 20 to the shaft for angular movement therewith and the diameter of the sleeves is slightly less than that of the electrically conductive discs 9 and the end plates 11. The rings 21, although slightly spaced from the end plates 11 co-operate therewith to effect continuous feeding movement of a card presented thereto by any suitable means, forming no part of the present invention, but which present cards to the rollers in timed relation with the linear speed of sensing pins 22, one such means being illustrated diagrammatically in Fig. 2.

The conductive drum 20 is of lesser diameter than that of the rings 21 so that it is spaced peripherally from the conductive discs 9 and is provided with a plurality of columns of electrically conductive sensing pins 22, one such column being provided for each electrically conductive disc 9 and each column includes pins equi-spaced angularly round the drum and corresponding in number to the number of data-indicating positions in a card column. Thus in the construction shown in Fig. 2 of the drawings, each column of pins comprises twelve pins, which is the normal number of data-indicating positions contained in a vertical column of a statistical record card. Each pin 22 is housed in an aperture 23 formed by a slot extending lengthwise of the drum and is provided with a shoulder 24 which, due to the action of a spring 25, is urged into engagement with a cover plate 26 secured to the periphery of the drum. The pins 28 are movable axially with respect to the drum in a direction which is radial of the drum. The tail or inner end of each pin 22 is movable in a drilled hole 27 communicating with the aperture 23, the arrangement being such that the pin makes electrical contact with the drum while being capable of axial movement against the action of its spring 25 when it is depressed by engagement with an imperforate portion of a card.

Electric potential is applied to the drum 20 in any suitable manner by a lead 28, Fig. 5, the potential being applied to lead 28 intermittently and for an interval of time corresponding with that during which any one pin 22 can be in contact with its appropriate disc 9, control of such timing being by a rotary switch 29, Fig. 5, which switch is rotated in timed relation with the drive shaft 7 and has a conductive sector 30 which is operative to complete the electric circuit when the pins 22 are in position to co-operate with a card.

As a card is fed continuously forward by cooperation of the plates 11 and rings 21, the pins of a column are presented in succession to sense the appropriate data-indicating positions of the card to ascertain whether or not such positions are perforate and in the event that a position is perforate, the sensing pin appropriate thereto enters the perforation and, during movement of the pin with the card, co-operates with the electrically conductive disc 9 appropriate thereto so that an impulse transmitted along lead 28 is transmitted through ring 21, drum 20, the pin, the disc 9 with which it co-operates, the brush 15 for the disc, and lead 19, to effect actuation of the part of the machine which is to be operated as the result of the sensing of the card. The pins 22 are moved by the roller 20 in timed relation with the feeding of cards so that the first pin of a column, as illustrated in Figs. 2 and 5, coincides with the first data-indicating position in a card column presented for sensing. It will be understood that if a pin engages an imperforate portion of the card no impulse will be passed to the disc 9 as the card will insulate the disc 9 from the depressed pin.

From the foregoing it will be understood that by the arrangement of sensing apparatus as described herein, the sensing pins do not directly effect operation of any mechanical part axial movement thereof can be reduced to a minimum and the load on the pins is negligible as they do not have to effect any mechanical work. Further, since the pins cooperate with a hard surface as presented thereto by the periphery of the disc 9 co-operating therewith, the pins do not damage the card. The strength of the springs 25 which urge the pins outwards in a radial direction with respect to the drum 20 is also so selected that even though the pin will encounter an imperforate card portion before the pin actually presses against its disc 9 the pressure of the spring is not such as will tend to cause the pin to damage the imperforate card.

I claim:

1. A device for sensing perforations in statistical record cards comprising a first rotatable shaft, an electrically conductive disc for each card column to be sensed, electrically non-conductive discs spacing the conductive discs one from the other, clamping elements insulated from the electrically conductive discs to retain the conductive and non-conductive discs in endwise abutting relation and supporting them for angular movement with said first shaft, an electrical brush co-operating with each said conductive disc, a second shaft rotatable in timed relation with said first shaft, an electrically conductive drum insulated from said second shaft and supported thereby for angular movement therewith and to be spaced peripherally from said conductive discs, a plurality of columns of electrically conductive pins, one column for each said conductive disc, each of which columns includes pins equi-spaced angularly round the drum and corresponding in number to the number of data-indicating positions in a card column, said pins being carried by said drum for movement thereby in timed relation with the feeding of cards so that the first pin of a column coincides with the first data-indicating position in a card column presented for sensing, the pins being supported for electrical co-operation with the drum and axial movement radially thereof, springs urging the pins axially away from the centre of the drum for co-operation with the conductive discs appropriate thereto, and means to apply electrical potential to said drum in timed relation with the movement of the pins by the drum.

2. A device according to claim 1, wherein the said drum is provided at its opposite ends with electrically conductive rings carried by sleeves of electrically insulating material insulating the rings and roller from said second shaft, said rings being movable angularly with the drum and co-operating with circular end plates movable angularly with said discs thereby to effect continuous feeding movement of a card during sensing thereof.

3. A device according to claim 1, wherein said brushes comprise L-shaped elements of which alternate ones face in opposite directions, said elements having their upwardly extending limbs located in an insulated housing common thereto and their other limbs urged into co-operation with the electrically conductive discs by springs independent thereto and located in said housing.

4. A device for sensing perforations in statistical record cards, comprising a first rotatable shaft, an electrically conductive disc for each card column to be sensed, electrically non-conductive discs spacing the conductive discs one from the other, clamping elements insulated from the electrically conductive discs to retain the conductive and non-conductive discs in endwise abutting relation and supporting them for angular movement with said first shaft, L-shaped brush elements, one for each conductive disc, of which alternate ones face in opposite directions, an insulated housing in which are located the upwardly extending limbs of the brush elements, springs located in the housing and co-operating with the other limbs of the brush elements to urge them into co-operation with the conductive discs appropriated thereto, a second shaft rotatable in timed relation with said first shaft, an electrically conductive drum, electrically conductive rings carried by sleeves of electrically insulating material mounted on and at the opposite ends of the roller and connecting the roller to the second shaft for angular movement therewith in spaced peripheral relation with said discs while permitting the rings to co-operate with said clamping elements to effect continuous feeding movement of a card during sensing thereof, a plurality of columns of electrically conductive pins, one column for each said conductive disc, each of which columns includes pins equi-spaced angularly round the drum and corresponding in number to the number of data-indicating positions in a card column, said pins being carried by said drum for movement thereby in timed relation with the feeding of cards so that the first pin of a column coincides with the first data-indicating position in a card column presented for sensing, the pins being supported for electrical co-operation with the drum and axial movement radially thereof, springs urging the pins axially away from the centre of the drum for co-operation with the conductive discs appropriate thereto, and means to apply electrical potential to said drum in timed relation with the movement of the pins by the drum.

No references cited.